United States Patent [19]

Fukuzumi

[11] Patent Number: 5,737,582

[45] Date of Patent: Apr. 7, 1998

[54] IC CARD AND IC CARD SYSTEM

[75] Inventor: Tomoya Fukuzumi, Itami, Japan

[73] Assignee: Mitsubishi Denki Kabushiki Kaisha, Tokyo, Japan

[21] Appl. No.: 523,512

[22] Filed: Sep. 1, 1995

[30] Foreign Application Priority Data

Sep. 2, 1994 [JP] Japan .................................. 6-210003
Dec. 28, 1994 [JP] Japan .................................. 6-328608

[51] Int. Cl.$^6$ .................................................. G06F 9/02
[52] U.S. Cl. .................................. 395/500; 364/709.1
[58] Field of Search ........................ 395/500; 361/684, 361/784; 364/709.1, 683, 708.1, 929.4, 929.5; 439/928.1, 74

[56] References Cited

U.S. PATENT DOCUMENTS

| | | | |
|---|---|---|---|
| 4,683,550 | 7/1987 | Jindrick et al. | 364/900 |
| 4,980,856 | 12/1990 | Ueno | 364/900 |
| 5,201,038 | 4/1993 | Fielder | 395/325 |
| 5,425,646 | 6/1995 | Green | 439/79 |
| 5,440,755 | 8/1995 | Harwer et al. | 395/800 |
| 5,446,869 | 8/1995 | Padgett et al. | 395/500 |
| 5,530,887 | 6/1996 | Harper et al. | 395/800 |

FOREIGN PATENT DOCUMENTS 6-150085  5/1994  Japan ...................... G06K 19/077

Primary Examiner—Kevin J. Teska
Assistant Examiner—Matthew Loppnow
Attorney, Agent, or Firm—Leydig, Voit & Mayer, ltd

[57] ABSTRACT

An IC card and an IC card system that enable a variety of functions to be added to the IC card. A variety of functions are provided for individual key cards (sub-cards), and the individual key card is detachable from the main body of an IC card so that the addition of and change are easily performed by insertion and change of the individual key card.

14 Claims, 10 Drawing Sheets

IC CARD AND IC CARD SYSTEM

BACKGROUND OF THE INVENTION

1. Field of the Invention

This invention relates to an IC card and an IC card system for use in an OA (office automation) equipment, a personal computer or the like.

2. Description of the Related Art

IC cards have been widely used in personal computers and the like. The IC cards include, in the category thereof, memory cards, modem cards, LAN cards and the like, that are usually collectively called IC cards or PC cards. FIGS. 18 and 19 are a block diagram and a perspective view respectively showing a known IC card and host system such as a personal computer into which the IC card is inserted. As shown in FIGS. 18 and 19, the IC card 7 is inserted into an IC-card slot (an IC-card insertion port) 8a provided to a host system 8 such as a personal computer when the IC card 7 is used. Initially, the structure of the host system 8 will now be described. The host system 8, as shown in FIG. 18, includes a CPU 13, which is a central processing means, and an IC card control portion 9 electrically connected between the CPU 13 and the inserted IC card 7 so as to control the IC card 7. Furthermore, a keyboard 10 is disposed on the outer surface or in the outside of the host system and electrically connected to the CPU 13 in the host system 8.

The structure of the IC card 7 will now be described. The IC card 7 includes a function portion 14, as shown in FIG. 18. When security of the function portion 14 is necessary, the IC card 7 is provided with a memory 11 storing a password code or ID code; and a password code collating portion 12 for collating or comparing a signal supplied from the keyboard 10 of the host system 8 with the password code in the memory 11. Thus, the security with respect to the contents of the IC card 7 is administered with the foregoing password code. The function portion 14 comprises a memory in a case where the IC card 7 is a memory card. If the IC card 7 is a LAN card or a modem card, a function for operating as a LAN or a modem and a rear connector and the like for establishing the connection with an external communication device are mounted in the function portion 14.

The operation will now be described. When the IC card 7 is used, a desired IC card is selected from a group consisting of a memory card, a LAN card and a modem card, the selected IC card 7 being then inserted into an IC-card slot 8a of the host system 8 so as to be used. Since the IC-card slot 8a is standardized by the guide line of JEIDA (Japan Electronic Industry Development Association) in Japan, and by the guide line of PCMCIA, the IC-card slot 8a can be used commonly regardless of the IC card 7 being a memory card, a LAN card or a modem card. When the IC card 7 is operated, the password code or ID code is input through the keyboard 10 of the host system 8; and the contents of the password code are collated with the password code stored in the memory 11 of the IC card in the password code collating portion 12. If the two password codes coincide with each other, the IC card 7 can be operated.

However, the known IC card and IC card system suffer from a problem in that additional expansion of the memory or extension of the function after delivery is substantially impossible for a user.

Furthermore, it is impossible for the known IC card and IC card system to arbitrarily change the specification of the IC card to meet a purpose. Therefore, individual IC cards must be for a variety of conditions for use, thus resulting in a problem in that the convenience is unsatisfactory and the cost cannot be reduced.

SUMMARY OF THE INVENTION

The present invention is directed to overcome the foregoing problems, and therefore an object of the present invention is to provide an IC card and an IC card system that additionally allow a user to easily add or change a portion of the function of the IC card as the need arises or to meet conditions for use even after the IC card has been delivered.

According to a first aspect of the present invention, there is provided an IC card comprising: a main body; and a separative sub-card having a connector for being connected to the main body and an additional function disposed therein.

According to a second aspect of the present invention, there is provided an IC card arranged such that the IC card is an IC card that is connected to the host system at the time of use, the IC card comprising: a function portion disposed to the main body and having a function of the IC card; and switching control means provided over the connector from the main body to the sub-card for operating the function portion in response to a control signal from the host system only when the sub-card is connected to the main body through the connector, whereby insertion/removal of the sub-card causes whether or not the function portion is operated to be switched.

According to a third aspect of the present invention, there is provided an IC card arranged such that the switching control means comprises: first insertion signal generating means for generating a signal indicating insertion of the sub-card when the sub-card has been inserted into the main body; signal control means electrically connected to the first insertion signal generating means for permitting supply of the control signal from the host system to the function portion only when the signal has been supplied from the first insertion signal generating means and inhibitting the supply of the control signal to the function portion in other cases.

According to a fourth aspect of the present invention, there is provided an IC card arranged such that the switching control means comprises: a first signal line provided to the main body and electrically connected to the junction portion; a second signal line provided to the main body for receiving the control signal from the host system; and connection means provided to the sub-card for electrically connecting between the first signal line and the second signal line.

According to a fifth aspect of the present invention, there is provided an IC card arranged such that the switching control means comprises: a password memory provided to the sub-card for storing a password code of the IC card; a password code collating portion provided to the main body for receiving a password signal from the outside through the host system and collating the password code of the password memory and the password signal supplied from the outside to each other so as to transmit a signal for operating the function portion only when the password code and the password signal coincide with each other.

According to a sixth aspect of the present invention, there is provided an IC card arranged such that the IC card is an IC card that is connected to the host system at the time of use, the IC card comprising: a first memory provided to the main body; a second memory provided to the sub-card; and memory access means provided to the main body for accessing to the first and second memories under control of the host system.

According to a seventh aspect of the present invention, there is provided an IC card arranged such that the second memory comprises an erasable nonvolatile semiconductor memory.

According to an eighth aspect of the present invention, there is provided an IC card arranged such that the memory access means comprises: second insertion signal generating means for generating a signal indicating insertion of the sub-card when the sub-card has been inserted into the main body; and insertion signal output means for transmitting the signal from the second insertion signal generating means to the host system.

According to a ninth aspect of the present invention, there is provided an IC card arranged such that the IC card is an IC card that is connected to the host system to permit communication between the host system and an external communication device, the IC card comprising: first interface means provided to the main body and connected to the connector so as to perform communication with the host system; a first rear connector provided to the sub-card for being connected to the communication device; and communication control means provided to the main body for being connected between the first interface means and the first rear connector so as to control the communication.

According to a tenth aspect of the present invention, there is provided an IC card arranged such that the IC card is an IC card that is connected to the host system to permit communication between the host system and an external communication device, the IC card comprising: first and second of said sub-cards; second interface means provided to the main body and connected to the connector so as to perform communication with the host system; a second rear connector provided to the main body for being connected to the communication device; first communication control means provided to the first sub-card for being connected between the second interface means and the second rear connector so as to control the communication by a first method; and second communication control means provided to the second sub-card for being connected between the second interface means and the second rear connector so as to control the communication by a second method; whereby exchanging between the first sub-card and the second sub-card enables the communication method to be changed between the first and second method.

According to an eleventh aspect of the present invention, there is provided an IC card arranged such that the first communication control means has a modem controller and the second communication control means has a LAN controller.

According to a twelfth aspect of the present invention, there is provided an IC card further comprising logic changing means for changing logic of the second interface means to be adaptable to any one of the first communication control means and the second communication control means under control of the host system.

According to a thirteenth of the present invention, there is provided an IC card further comprising falling-off preventing means provided to the sub-card and the main body for being mechanically engaged to each other so as to prevent fall-off of the sub-card from the main body.

According to a fourteenth aspect of the present invention, there is provided an IC card system comprising a host system and an IC card that is connected to the host system, wherein the IC card has a main body and a separative sub-card having a connector for being connected to the main body and an additional function disposed therein.

As described above, since the IC card according to the first aspect comprises a main body, and a separative sub-card having a connector for being connected to the main body and an additional function disposed therein, use of sub-cards respectively having additional functions adaptable to the purposes enables the IC card to have a variety of functions.

The IC card according to the second aspect has the arrangement such that the IC card is an IC card that is connected to the host system at the time of use, the IC card comprising a function portion disposed in the main body and having a function of the IC card, and switching control means provided over the connector from the main body to the sub-card for operating the function portion in response to a control signal from the host system only when the sub-card is connected to the main body through the connector. Therefore, insertion/removal of the sub-card causes whether or not the function portion is operated to be switched.

The IC card according to the third aspect has the arrangement such that the switching means comprises first insertion signal generating means for transmitting a signal indicating insertion of the sub-card when the sub-card has been inserted into the main body, signal control means electrically connected to the insertion signal generating means and arranged to permit supply of the control signal from the host system to the function portion only when the signal has been supplied from the insertion signal generating means and inhibit the supply of the control signal to the function portion in other cases. Thus, only when the sub-card has been inserted, the function portion of the IC card can be operated.

The IC card according to the fourth aspect has the arrangement such that the switching control means comprises a first signal line provided for the main body and electrically connected to the function portion, a second signal line provided for the main body and arranged to receive the control signal from the host system, and connection means provided for the sub-card and arranged to establish the electrical connection between the first signal line and the second signal line. Thus, only when the sub-card has been inserted, the function portion of the IC card can be operated.

The IC card according to the fifth aspect has the arrangement such that the switching means comprises a password memory provided from the sub-card for storing a password code of the IC card, a password code collating portion provided for the main body for receiving a password signal from the outside through the host system and collating the password code of the password memory and the password signal supplied from the outside to each other so as to transmit a signal for operating the function portion only when the password code and the password signal coincide with each other. Thus, only when the sub-card has been inserted and as well as the password signal supplied from the outside coincides with the password code of the password memory, the function portion of the IC card can be operated.

The IC card according to the sixth aspect has the arrangement such that the IC card is an IC card that is connected to the host system at the time of use, the IC card comprising a first memory disposed in the main body, a second memory disposed in the sub-card, and memory access means disposed to the main body for accessing to the first and second memories under control of the host system. Therefore, the first memory is used as a usual memory space, while the second memory is used as an extended memory.

The IC card according to the seventh aspect has the arrangement such that the second memory comprises an erasable nonvolatile semiconductor memory. Thus, even after the sub-card mounted with the second memory has been removed from the main body of the IC card, the contents of the second memory can be stored.

The IC card according to the eighth aspect has the arrangement such that the memory access means comprises second insertion signal generating means for generating a signal indicating insertion of the sub-card when the sub-card has been inserted into the main body, and insertion signal output means for transmitting the signal from the insertion signal generating means to the host system. Thus, the host system is able to detect the insertion of the sub-card in response to the foregoing signals.

The IC card according to the ninth aspect has the arrangement such that the IC card is an IC card that is connected to the host system to permit communication between the host system and an external communication device, the IC card comprising first interface means disposed in the main body and connected to the connector so as to perform communication with the host system, a first rear connector provided to the sub-card for being connected to the communication device, and communication control means disposed to the main body for being connected between the first interface means and the first rear connector so as to control the communication. Thus, a plurality of sub-cards having a variety of rear connectors are prepared to appropriately change the type of the rear connector to be adaptable to the type of the communication device.

The IC card according to the tenth aspect has the arrangement such that the IC card is an IC card that is connected to the host system to permit communication between the host system and an external communication device, the IC card comprising second interface means disposed to the main body and connected to the connector so as to perform communication with the host system, second rear connector provided for the main body for being connected to the communication device, first communication control means provided to the first sub-card for being connected between the second interface means and the second rear connector so as to control the communication by a first method, and second communication control means provided to the second sub-card for being connected between the second interface means and the second rear connector so as to control the communication by a second method, therby exchanging between the first sub-card and the second sub-card enables the communication method to be changed between the first and second method. Thus, the communication method can be changed by exchanging the first sub-card and the second sub-card.

The IC card according to the eleventh aspect has the arrangement such that the first communication control means has a modem controller and the second communication control means has a LAN controller. Therefore, change of the sub-card enables one IC card to perform both of a modem function and a LAN function.

The IC card according to the twelfth aspect further comprises logic changing means for changing logic of the second interface means to be adaptable to the first communication control means or the second communication control means under control of the host system. Thus, the logic of the second interface means can be changed under control of the host system.

The IC card according to the thirteenth aspect further comprises falling-off preventing means provided to the sub-card and the main body for being mechanically engaged to each other so as to prevent fall-off of the sub-card from the main body. Thus, the sub-card can be secured into the main body by the falling-off preventing means.

The IC card system according to the fourteenth aspect comprises a host system and an IC card that is to be connected to the host system, wherein the IC card has a main body and a separative sub-card having a connector for being connected to the main body and an additional function disposed therein. Therefore, use of sub-cards that meet the purposes will enable a variety of functions to be added to the IC card.

DESCRIPTION OF THE PREFERRED EMBODIMENT

First Embodiment

Figure 1:
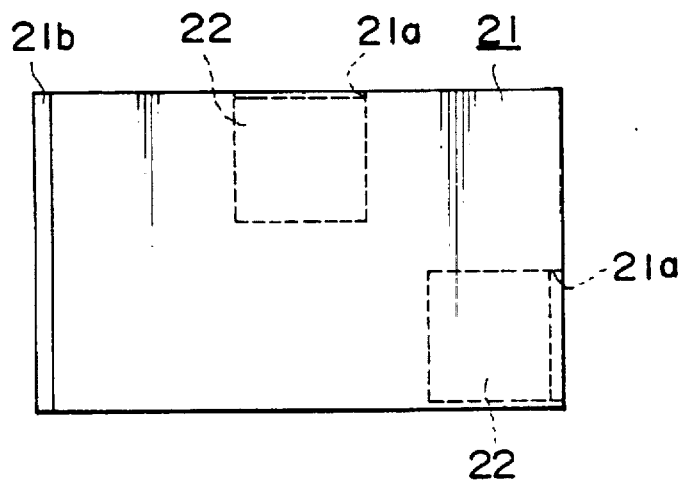
FIG. 1 is a top view showing an IC card according to the present invention.

FIG. 1 is a top view showing the structure of an IC card according to an embodiment of the present invention. As shown in FIG. 1, an IC card 21 according to the present invention has a structure that detachably accommodates individual key cards (sub-cards) 22 in the main body thereof, as indicated by dashed lines. One or more key cards 22 are, to meet a particular purpose, inserted into the IC card 21 through key-card slots (key-card insertion ports) 21a (see FIG. 5) in a side surface and an end surface of the IC card 21. The mechanical structure of the key cards 22 will be described later.

Figure 2:
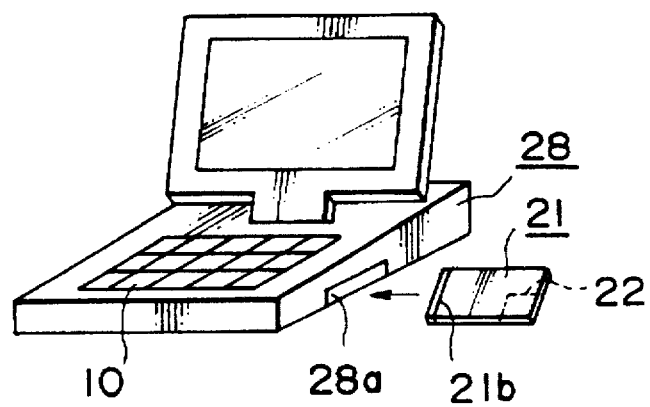
FIG. 2 is a perspective view showing an IC card of the present invention and a host system to which the IC card is connected.

The key cards 22 may be used to administered the security of the IC card, and may be used as add-on memories for the IC card if a memory is mounted in each of the key cards 22. If a variety of rear connectors are to be changed and adaptable to an apparatus for connection, the versatility of the IC card can be improved. By using a variety of the foregoing key cards 22 to meet various purposes, a variety of functions can easily be added to the IC card 21 or the functions can be changed easily. The IC card 21 is, as shown in FIG. 2, inserted into an IC-card slot 28a provided for a host system 28 of a personal computer or the like, the IC card 21 having a connector 21b thereof that establishes the electrical connection with the host system 28 when the IC card system is used. Since the structure of the host system 28 is similar to the known host system 8 shown in FIG. 12, description of the host system 28 is omitted here.

Figure 3:
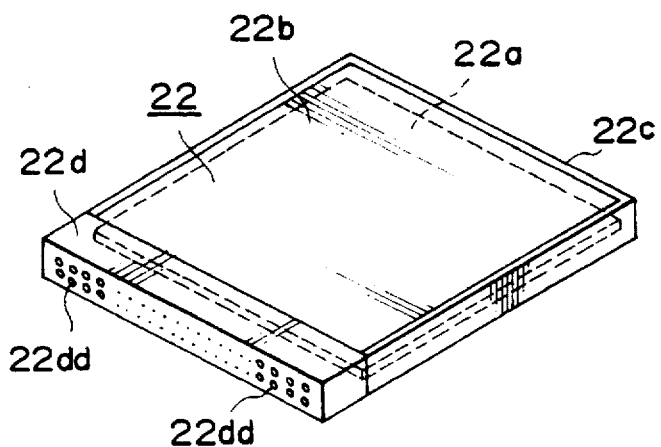
FIG. 3 is a perspective view showing the mechanical structure of an individual key card or sub-card according to a first embodiment of the present invention.
Figure 4:
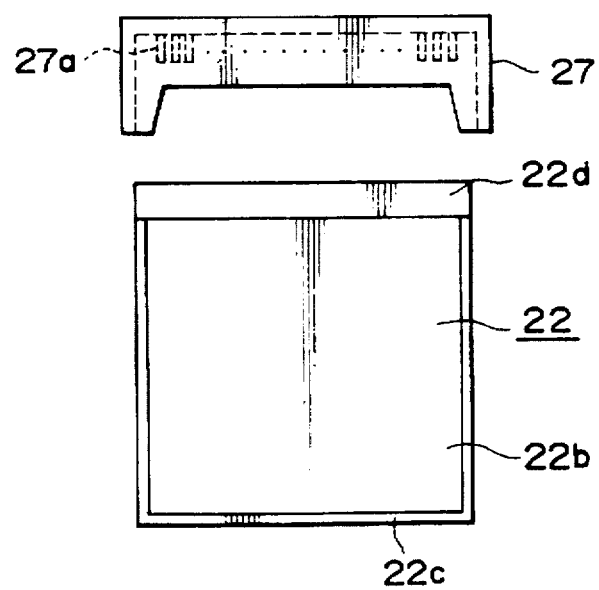
FIG. 4 is a top view showing the key card and an IC-card-side connector to which the key card is connected according to the first embodiment of the present invention.

The mechanical structure of the key card 22 will now be described. FIG. 3 is a perspective view showing an example of the structure of the key card 22. FIG. 4 is a top view showing the key card 22 and an key card connector 27 provided in the IC card 21 to receive the key card 22. As shown in FIG. 3, the key card 22 includes a substrate 22a. The substrate 22a has a circuit pattern (not shown) thereon to realize additional functions required for the key card 22. The key card 22 has a substantially rectangular shape and comprises a connector 22d on a front and surface thereof. The connector 22d is mechanically connected to one of the sides of the substrate 22a, the connector 22d being electrically connected to the circuit pattern formed on the substrate 22a. The connector 22d has, as illustrated, a plurality of socket contacts 22dd, that are terminals of the key card 22, the socket contacts 22dd being arranged to form two lines so as to be electrically connected to contact pins 27a that are terminals of the key card connector 27 shown in FIG. 4, when the key card 22 is connected to the IC card 21. A main frame 22c having a squared U-shape facing side and made of resin is secured to the three other sides of the substrate 22a, as shown in FIGS. 3 and 4. Furthermore, two rectangular panels 22b made of metal are bonded onto the main frame 22c so that the key card 22 is formed.

Figure 5:
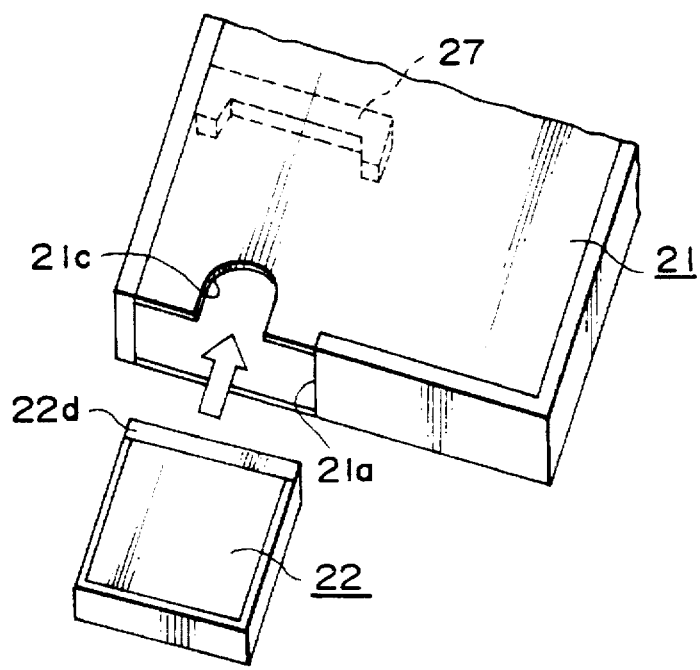
FIG. 5 is a perspective view showing a state where the key card according to the first embodiment of the present invention is inserted into an IC card.
Figure 6:
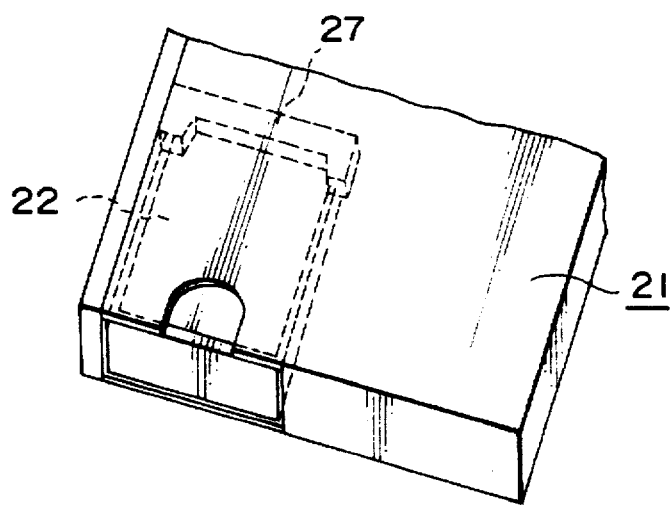
FIG. 6 is a perspective view showing a state where the key card shown in FIG. 5 is mounted in the IC card.

On the other hand, the key card connector 27 is, as shown in FIG. 5, disposed in the IC card 21. Thus, when the key card 22 is inserted through the key-card slot 21a formed in the side surface of the IC card 21, the connector 22d of the key card 22 and the key card connector 27 are, as shown in FIG. 6, electrically connected to each other so that the key card 22 is mounted and accommodated in the IC card 21. Note that the key-card slot 21a may have a cut portion 21c for removing the key card 22 if the key card 22 is not used.

As described above, the key card 22 can easily be inserted into the IC card 21 through the key-card slot 21a provided for the IC card 21, and the key card 22 can easily be connected to the key card connector 27 so that insertion/removal of the key card 22 enables the additional function to be easily added or removed. Thus, the IC card 21 can be used conveniently. Since the main frame 22c and the panels 22b perfectly protect the circuit pattern in the key card 22, satisfactory mechanical strength can be realized so that the internal circuit pattern is protected from mechanical damage even, for example, in a case where a user carries the IC card 21.

Second Embodiment

Figure 7:
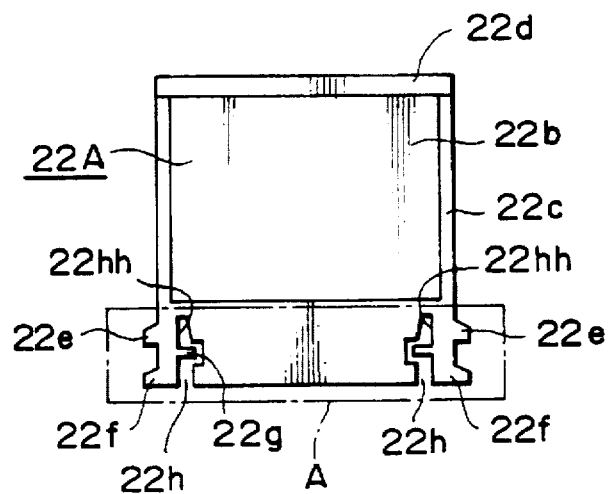
FIG. 7 is a top view showing the mechanical structure of an individual key card according to a second embodiment of the present invention.
Figure 8:
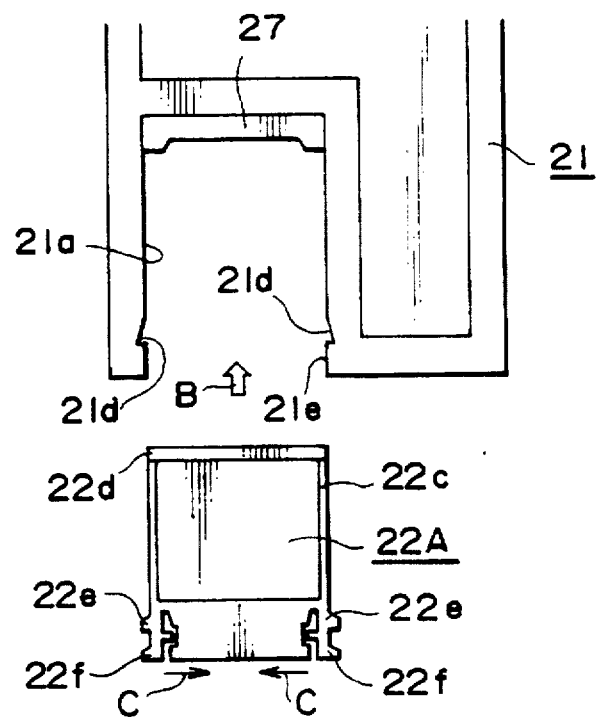
FIG. 8 is a top view showing a state where the key card according to the second embodiment of the present invention is inserted into an IC card.

In this embodiment, another example of the mechanical structure of a key card 22A is described. As shown in FIG. 7, the key card 22A according to this embodiment has falling-out preventing means formed at positions opposing the connector 22d so as to prevent fallout of the key card 22A from the IC card 21. Since the residual structures are similar to those according to the foregoing first embodiment, the same elements are given the same reference numerals and they are omitted from the description. As shown in FIG. 7, a projection 22e projecting outwards over the side surface of the key card 22A transverse to the direction of the insertion (the direction of insertion is indicated by an arrow B shown in FIG. 8) is formed on each of the two sides of the key card 22A. Furthermore, projections serving as operation portions 22f are formed at the ends of the two side surfaces, on which the projections 22e are formed, and which oppose the connector 22d. To inwardly deflect the operation portions 22f when the key card 22A is inserted, cut portions 22h are formed. The projections 22e and the operation portions 22f are made of resin or are molded integrally with the main frame 22c of a resin having appropriate elasticity and strength to prevent breakage when they are deflected toward the cut portions 22h. To restrict the degree of the deflection of the operation portions 22f, projection members 22g may be formed on end surfaces 22hh of the cut portions 22h, as the need arises. Thus, the falling-out preventing means comprises projections 22e, operation portions 22f and the cut portions 22h formed in a portion surrounded by alternating long and short dashed lines, and pits 21d formed in the IC card 21, as shown in FIG. 8. When the key card 22A is mounted in the IC card 21, the projections 22e of the key card 22A and the pits 21d of the IC card 21 are engaged to one another so that fall-out of the key card 22A is prevented.

Since the key card 22A according to this embodiment has the foregoing structure, insertion of the key card 22A into the key-card slot 21a in the direction indicated by the arrow B causes the projections 22e to be brought into contact with the frame 21e of the IC card 21 so that the projections 22e are somewhat deflected inwards in directions indicated by arrows C shown in FIG. 8. When further insertion of the key card 22A has caused the connector 22d to be completely connected to the IC-card-side connector 27, the projections 22e are returned, due to the elasticity thereof, so that the projections 22e are engaged to the pits 21d. At this time, the operation portions 22f are outwardly exposed from the key-card slot 21a. The foregoing engagement between the projections 22e and the pits 21d prevents falling out of the key card 22A from the key-card slot 21a.

When the key card 22A is removed from the key-card slot 21a, the operation portions 22f are deflected in the directions indicated by the arrows C by the fingertip or the nail of the finger to disengage the projections 22e and the pits 21d. Then, withdrawing of the key card 22A in the foregoing state enables the key card 22A to be removed.

As described above, according to this embodiment, an effect similar to that obtainable from the foregoing first embodiment can be obtained. Furthermore, the falling-out preventing means provided for the key card 22A enables the key card 22A to be reliably secured into the key-card slot 21a. Thus, the electrical connection between the connector 22d and the IC card connector 27 can be stabilized. Disconnection between the same also can easily be performed.

Third Embodiment

Figure 9:
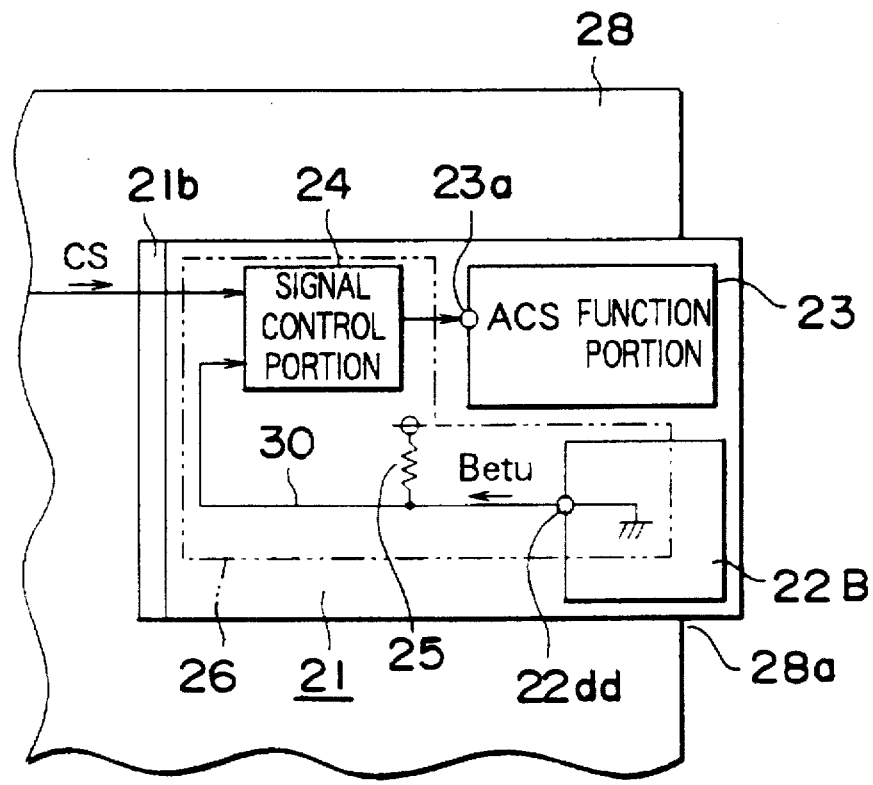
FIG. 9 is a block diagram showing the structure of an IC card and an individual key card according to a third embodiment of the present invention.
Figure 10:
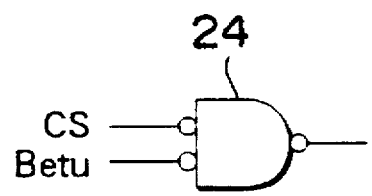
FIG. 10 is a diagram showing a NAND circuit forming the signal control portion shown in FIG. 9.

In this embodiment, the key card 22 and 22A according to the first embodiment and the second embodiment has a specific additional function. The known IC card provides security by using a password code as described above. In this case, there is a possibility of decoding the password code and thus the IC card can be used unlawfully. Accordingly, this embodiment, insertion/removal of the key card 22B prevents unlawful use and provides security. FIG. 9 is a block diagram showing the structure of this embodiment. As shown in FIG. 9, the IC card 21 includes: a function portion 23 serving a variety of functions of the IC card 21, such as a memory, LAN, a modem or the like; and a signal control portion 24 that receives a control signal CS from the host system 28 into which the IC card 21 has been inserted, and signal Betu from terminals 22dd of the key card 22B so as to transmit to an ACS terminal 23a provided for the function portion 23 a signal for controlling whether operation of the function portion 23 is permitted. A pull-up resistor 25 is connected to a signal line 30 that establishes the connection between the terminals 22dd of the key card 22B and the signal control portion 24. Therefore, if the key card 22B is not inserted into the IC card 21, the level of the signal Betu is fixed to a high level. If the key card 22B has been inserted, the foregoing level is automatically switched to a low level. The signal control portion 24 comprises a NAND circuit having two input terminals which are inverting inputs, as shown in FIG. 10. Thus, when the levels of both of the signal CS and the signal Betu are low, the level of the output from the signal control portion 24 is low, whereas the level of the output in other cases is high. The signal control portion 24 may comprise an OR circuit or the like in place of the NAND circuit shown in FIG. 10.

As described above, in this embodiment, the signal control portion 24, the pull-up resistor 25, the signal line 30 and the terminals (socket contacts) 22dd of the key card 22B are part of a switching control means 26 that is electrically conductive only when the key card 22B has been inserted into the main body of the IC card 21 and that operates the function portion 23 in response to a control signal supplied from the host system 28. The description will be made further in detail. The terminals 22dd and the pull-up resistor 25 of the key card 22B are part of a first insertion-signal generating means for transmitting a signal indicating that the key card 22B has been inserted. The signal control portion 24 and the signal line 30 are part of a signal control means, which allows control signal CS from the host system 28 to be supplied to the function portion 23 only when the signal transmitted by the insertion-signal generating means indicating that the key card 22B has been inserted has been supplied thereto, and which inhibits supply of the control signal CS in other cases.

The operation will now be described. To operate the function portion 23 for realizing a variety of functions of the IC card 21 (causing the IC card 21 to be operated), the key card 22B is inserted so that the level of the signal Betu is lowered; and the level of the signal CS from the host system 28 into which the IC card 21 has been inserted is set to a low level, so that the signal control portion 24 transmits a low-level signal to the ACS terminal 23a of the function portion 23. Thus, the low-level signal is supplied to the ACS terminal 23a of the function portion 23, thus enabling the function portion 23 to be operated. As a result, the IC card 21 can be operated. If the key card 22B has not been inserted, the signal control portion 24 always transmits high level signals regardless of the level of the signal CS because the pull-up resistor 25 pulls up the level of the signal Betu to a fixed high level. Therefore, the function portion 23 cannot be operated.

As described above, the IC card 21 according to this embodiment of the present invention is structured such that, if the key card 22B is not inserted, the signal CS cannot be made effective in the function portion 23 even if the level of the signal CS from the host system 28 is set to a low level to operate the function portion 23 because the level of the signal Betu is fixed to a high level by the pull-up resistor 25. As a result, the function portion 23 cannot be operated. Therefore, if the key card 22B is not inserted, the IC card 21 cannot be operated without exception. Thus, administration of the key card 22B can reliably prevent unlawful use of the IC card 21. As compared with the case of the related art described above where a password code is used for security administration, a protective effect (or a security effect) against unlawful use of the IC card 21 can be improved.

As described above, the IC card 21 according to this embodiment of the present invention is structured such that, if the key card 22B is not inserted, the function portion 23 cannot be operated. Therefore, if the key card 22B is not inserted, the IC card 21 cannot be operated without exception. Therefore, a protective effect (a security effect) against unlawful use of the IC card 21 can be improved as compared with the related art case where a password code is used to perform the security administration. Furthermore, the key card 22B exhibits excellent mechanical strength, portability and easy insertion into the IC card 21 so that the key card 22B can be used conveniently.

Fourth Embodiment

Figure 11:
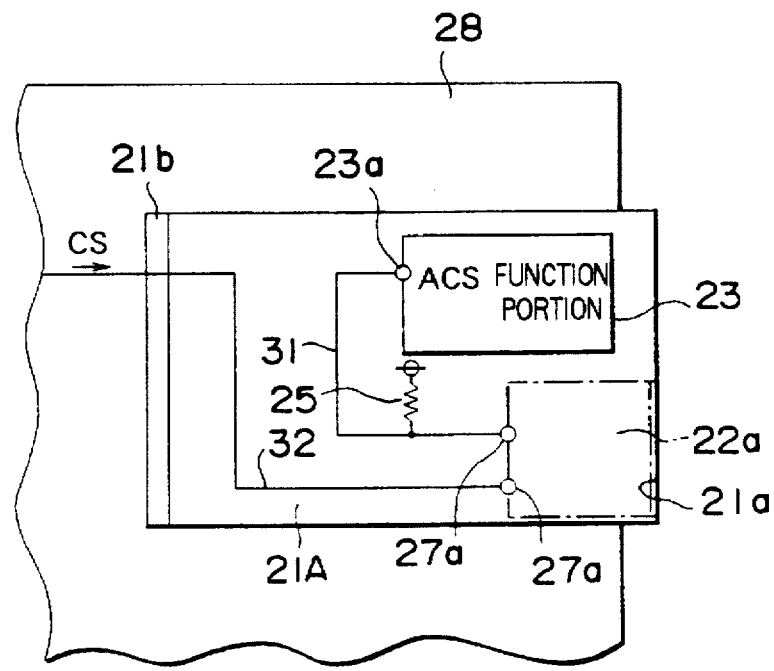
FIG. 11 is a block diagram showing the structure of an IC card in which an individual key card is inserted according to a fourth embodiment of the present invention.
Figure 12:
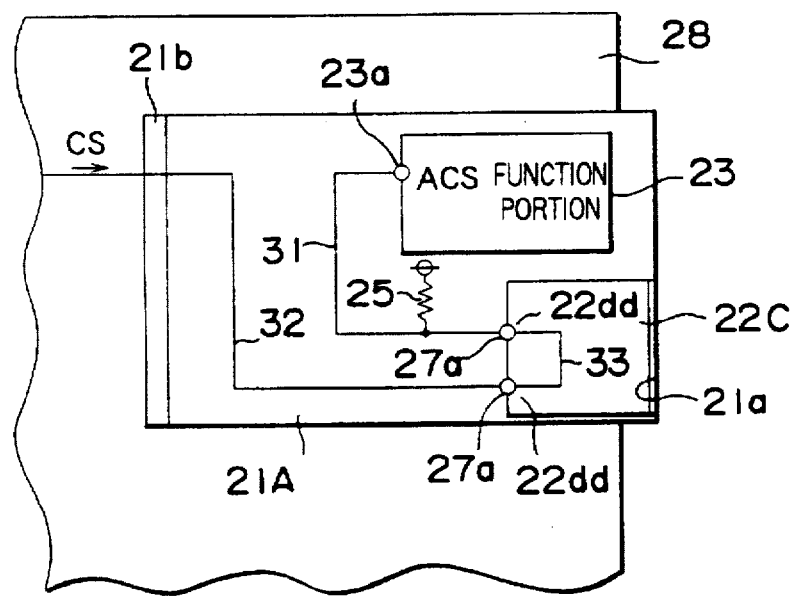
FIG. 12 is a block diagram showing a state where the individual key card is mounted in the IC card shown in FIG. 11.

FIGS. 11 and 12 are block diagrams showing another embodiment structured such that the key card of the IC card according to the present invention is used to provide security. FIG. 11 shows a state where the key card has not been inserted into the IC card, and FIG. 12 shows a state where the key card has been inserted. The mechanical structures of the key card and the key card connector, to which the key card is connected, are the same as those according to the first and second embodiments, and therefore they are omitted from the description. In this embodiment, as shown in FIG. 11, the function portion 23, which is the same as that according to the third embodiment, is provided in the IC card 21A. The ACS terminal 23a of the function portion 23 is, through a first signal line 31, disposed in the IC card 21A, electrically connected to one (hereinafter called a "first contact pin 27a") of the contact pins 27a (see FIG. 4) provided for the key card connector 27 (not shown here, refer to FIG. 5) to which the key card 22C (see FIG. 12) is connected. A region 22a indicated by an alternating long and short dashed lines shown in FIG. 11 is a key-card receiving region into which the key card 22C will be inserted. The key card connector 27 (see FIG. 5) is disposed on a side of the key-card receiving region 22a opposing the key-card slot 21a. A pull-up resistor 25 is connected to the signal line 31 that establishes the connection between the ACS terminal 23a and the foregoing first contact pins 27a.

A second signal line 32, to which the signal CS is supplied from the host system 28, is electrically connected to another contact pin 27a (hereinafter called a "second contact pin 27a") of the IC card connector 27. As shown in FIG. 12, the key card 22C includes a circuit pattern 33 which is a connection means for establishing electrical connections between the first and second contact pins 27a and further, between the signal lines 31 and 32. Thus, when the key card 22C has been inserted into and connected to the IC card 21A, the first and second contact pins 27a are electrically connected to each other through the circuit pattern 33. As a result, the signal line 32, through which the signal CS is supplied from the host system 28, and the ACS terminal 23a of the function portion 23 are electrically connected to each other through the signal line 31 and the circuit pattern 33 so that supply of the signal CS to the ACS terminal 23a is permitted.

The operation of this embodiment will now be described. The function portion 23 can be operated when a low-level signal has been supplied to the ACS terminal 23a, as in to the first embodiment. Therefore, the function portion 23 can be operated (that is, the IC card 21A can be operated) by inserting the key card 22C into the key-card receiving region 22a in the IC card 21A so as to establish the electrical connection between the contact pins 27a and the socket contacts 22dd (see FIG. 3) of the connector 22d (see FIG. 3) of the key card 22C. The signal line 32 for supplying the signal CS from the host system 28 and the ACS terminal 23a of the function portion 23 are electrically connected to each other to enable the signal CS from the host system 28 to be supplied to the ACS terminal 23a. Then, the low-level signal CS is transmitted by the host system 28 so that the low-level signal is supplied to the ACS terminal 23a to enable the function portion 23 to be operated.

If the key card 22C has not been inserted into the IC card 21A, the signal line 31 and the signal line 32 are not electrically connected to each other, as shown in FIG. 11. Furthermore, the pull-up resistor 25 provided on the signal line 31 causes a high-level signal to be always supplied to the ACS terminal 23a even if a low-level signal CS has been supplied from the host system 28 so as to enable the function portion 23 to be operated, so that the operation of the function portion 23 of the IC card 21A is inhibited.

As described above, also this embodiment inhibits the operation of the function portion 23 without exception if the key card 22C has not been inserted into the IC card 21A so that the operation of the IC card 21A is inhibited. Therefore, the protective effect against unlawful use of the IC card 21A can be obtained with a satisfactory security characteristic, similar to the third embodiment. Since the switching control means that permits the operation of the function portion 23 only when the key card 22C has been inserted has a simple structure consisting of two signal lines 31 and 32 and the circuit pattern 33 for establishing the connection between the two signal lines 31 and 32, the IC card 21A can easily be manufactured with a low cost.

Fifth Embodiment

Figure 13:
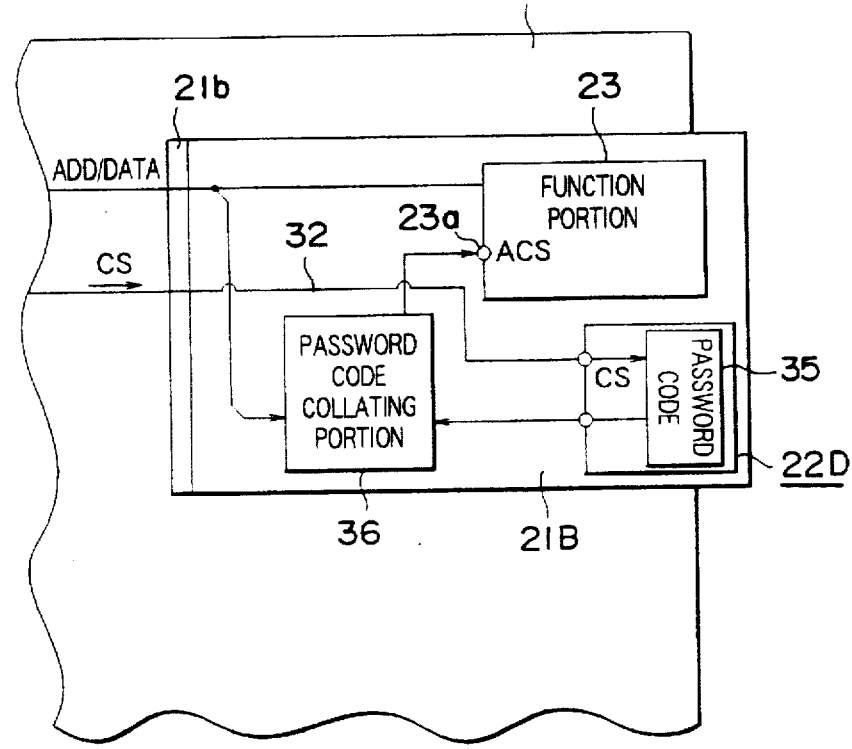
FIG. 13 is a block diagram showing the structure of an IC card and an individual key card according to a fifth embodiment of the present invention.

FIG. 13 is a block diagram showing another embodiment of the IC card according to the present invention and having a structure so that the key card is used to provide security, in which a state where the key card 22D has been inserted is shown. In this embodiment, as shown in FIG. 13, the key card 22D includes a memory 35 (or a password memory) which is mounted therein and stores a password code. Since the mechanical structure of the key card 22D is similar to that according to the third embodiment, its description is omitted here. On the other hand, the body of the IC card 21B includes: the function portion 23 similar to that of the first and second embodiments; and a password code collating portion 36. The password code collating portion 36 collates a password signal supplied from the host system 28A, into which the IC card 21B has been inserted, and a password code in the memory 35 in the key card 22D with each other. If the password signal and the password code coincide with each other, the password code collating portion 36 transmits a low-level signal to the ACS terminal of the function portion 23. If they do not coincide with each other, the password code collating portion 36 transmits a high-level signal.

The operation of this embodiment will now be described. Also this embodiment enables the function portion 23 to be operated if a low-level signal has been supplied to the ACS terminal 23a of the function portion 23. To supply the low-level signal to the ACS terminal 23a, the key card 22D is inserted and the signal CS from the host system 28A is set to a low level to bring the password code stored in the memory 35 in the key card 22D into a state where the password code can be read so that the password code is read. Then, a password signal supplied through, for example, a keyboard 10 (see FIG. 2) of the host system 28A, is supplied to the password code collating portion 36 through an address/data bus ADD/DATA so as to be collated with the password code in the memory 35 in the key card 22D. If the collation results in coincidence of the password signal and the password code, the low-level signal is transmitted to the ACS terminal 23a of the function portion 23 so that the operation of the function portion 23 is permitted. If the password signal and the password code do not coincide with each other, a high-level signal is transmitted so that the operation of the function portion 23 is inhibited.

If the key card 22D has not been inserted into the IC card 27B, no password code, to be subjected to collation, exists in the IC card 21B even if the password signal has been supplied to the password code collating portion 36 from the host system 28A. Thus, the password code collating portion 36 transmits a high-level signal to the ACS terminal 23a so that the operation of the function portion 23 is inhibited.

As described above, also this embodiment has a structure so that the operation of the function portion 23 is inhibited without exception if the key card 22D has not been inserted, similar to the first and second embodiments. Furthermore, the key card 22D has the memory therein to store the password code to perform a collation with a password signal supplied from outside of the system. Thus, the operation is permitted only when the password signal and the password code coincide with each other. Therefore, the protective effect against unlawful use of the IC card 21B can be made further reliable and excellent security can be established.

Sixth Embodiment

Figure 14:
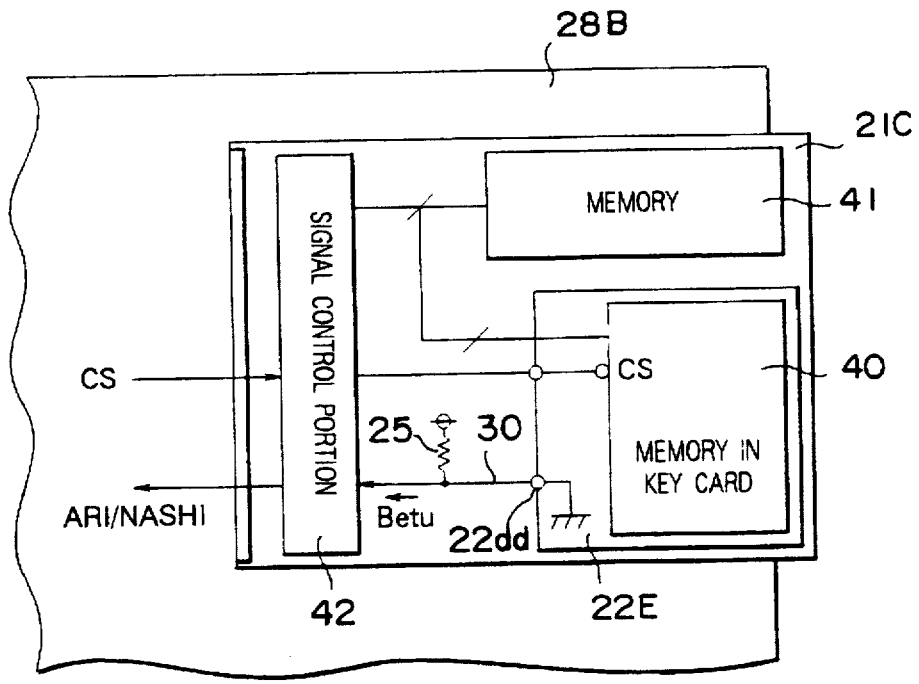
FIG. 14 is a block diagram showing the structure of an IC card and an individual key card according to a sixth embodiment of the present invention.

In this embodiment, the key card is used as an add-on memory or an extended memory. FIG. 14 is a block diagram showing the structure of this embodiment. Since the mechanical structures of the IC card 21C and the key card 22E are similar to those according to the first and second embodiments, they are omitted from the description here. The IC card 21C according to this embodiment is a memory card having a memory 41 serving as a first memory for use as a usual memory region. The memory space in the memory 41 comprises: a common memory space for storing usual data and the like; and an attribute memory space for storing attribute information of the IC card 21C. The IC card 21C further includes a signal control portion 42 that is a memory access means for controlling transmission/receipt of signals to and from the host system 28B and for getting access to the first memory and a second memory which is described later.

The key card 22E includes a memory 40 to be used in the key card 22E, that is a second memory serving as an add-on memory for the IC card 21C. Similar to the third embodiment (see FIG. 9), the pull-up resistor 25 is disposed at a position on the signal line 30 that establishes the connection between the terminals 22dd of the key card 22E and the signal control portion 42 so that, if the key card 22E has not been inserted into the IC card 21C, then the level of the signal Betu is fixed to a high level that is automatically switched to a low level when the key card 22E is inserted. The signal control portion 42 transmits to the host system 28B signal ARI/NASHI indicating whether the key card 22E is present by means of the high level or the low level in response to the signal Betu.

The terminals 22dd of the key card 22E and the pull-up resistor 25 are part of a second insertion signal generating means that transmits the signal indicating insertion of the key card 22E, while the signal control portion 42 is part of an insertion signal output means that transmits a signal from the second insertion signal generating means to the host system 28B.

The operation will now be described. The host system 28B detects whether or not the key card 22E has been inserted in response to the foregoing signal ARI/NASHI and transmits, through the signal control portion 42, a low-level signal CS to the memory 40 to be used in the key card 22E when the key card 22E has been inserted, so that access to the memory 40 to be used in the key card 22E is permitted. If a high-level signal CS has been received, access to the usual memory 41 of the IC card 21C is permitted. As described above, the signal CS forms a memory switching signal for switching the access between the memory 41 and the memory 40 to be used in the key card 22E.

As described above, this embodiment comprises the key card 22E having the memory 40 to be used in the key card 22E so that easy addition/removal of an add-on memory is permitted as the need arises by insertion/removal of the key card 22E. Thus, addition of a memory to the IC card, that has been impossible for the known IC card, can easily be performed.

Note that the memory 40 to be used in the key card may comprise a RAM to be used as a temporary add-on memory for operating the IC card 21C or a ROM storing a variety of data items to be used as an extended ROM. If the memory 40 to be used in the key card comprises an erasable ROM, such as an EEPROM or a flash memory, to permit a user to remove the key card 22E and carry the same in a case where the memory 40 to be used in the key card is not used, unlawful access to the contents of the memory 40 to be used in the key card can be prevented. Thus, the security administration of the contents of the memory 40 to be used in the key card can be performed.

Seventh Embodiment

Figure 15:
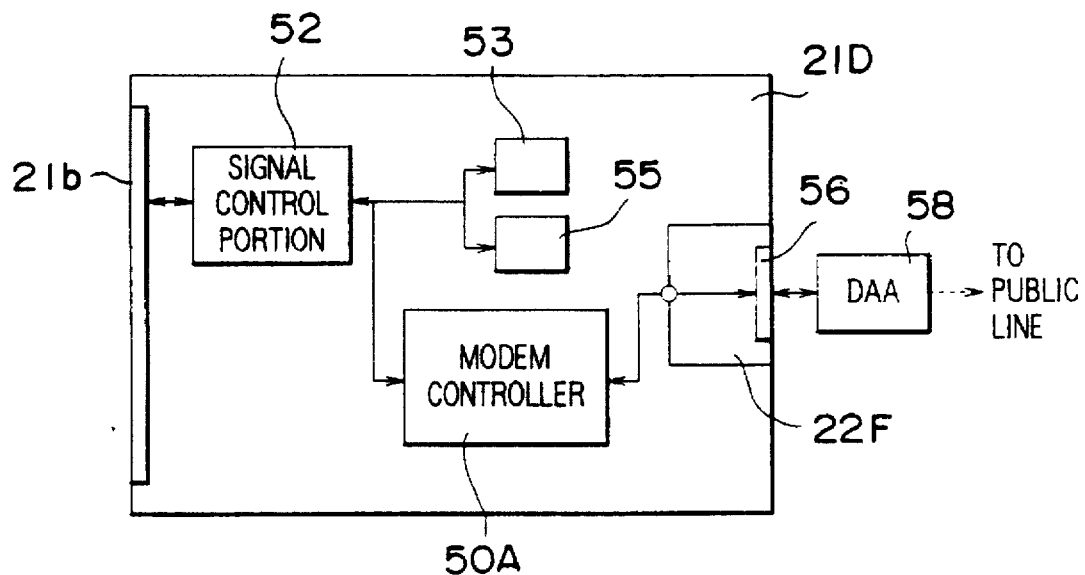
FIG. 15 is a block diagram showing the structure of an IC card (modem card) and an individual key card according to a seventh embodiment of the present invention.
Figure 16:
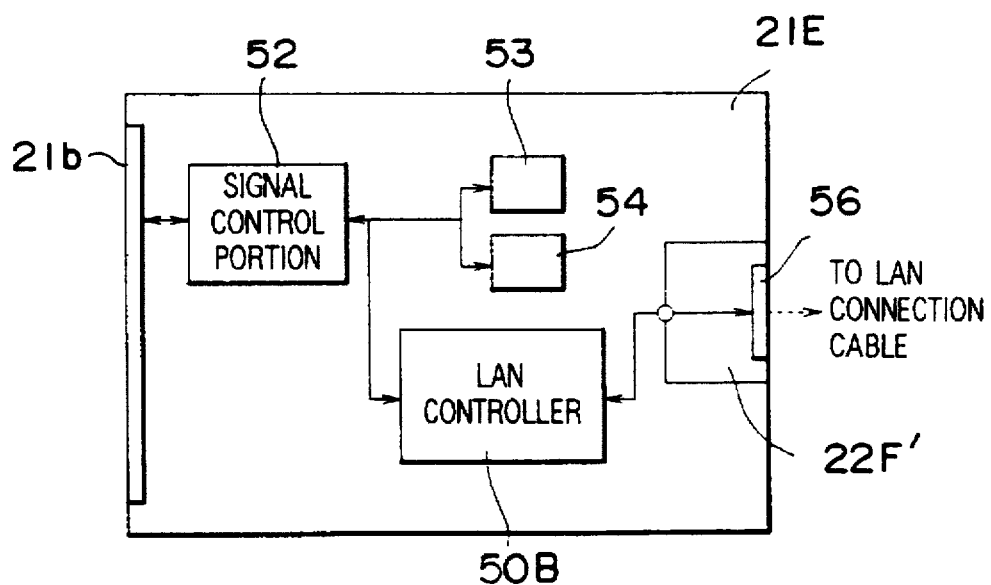
FIG. 16 is a block diagram showing the structure of an IC card (a LAN card) and an individual key card according to the seventh embodiment of the present invention.

In this embodiment, an IC card 21D serving as a modem card and an IC card 21E serving as a LAN card, respectively, have key cards 22F and 22F', each having a variety of rear connectors 56. Thus, the key cards 22F and 22F' are switched to be adaptable to a communication device (not shown) that is connected to the rear connector 56 to perform communication with the host system so that connection with any communication device is permitted to improve convenience of the system. FIG. 15 is a block diagram showing the structure of the IC card 21D serving as the modem card, and FIG. 16 shows the structure of the IC card 21E serving as the LAN card. In this embodiment, each of the IC cards 21D and 21E includes a signal control portion 52 serving as first interface means comprising an interface IC for controlling communication with the host system; and an attribute memory 53 storing CIS information (configuration index signal information) of the modem card or the LAN card. The IC card 21D serving as the modem card has a modem controller 50A having a modem function; and a firmware program memory 55 storing a firmware program for the modem function included therein. The IC card 21E serving as the LAN card is mounted with a LAN controller 50 having a LAN function; and a buffer memory 54 for temporarily storing data for the purpose of correcting a delay of the communication rate taking place between the host system and the connected communication device. The modem controller 50A and the LAN controller 50B are part of a communication control means connected between the interface means and the rear connector so as to control the communication.

In this embodiment, as shown in FIGS. 15 and 16, the rear connector 56 for establishing the connection with an external communication device is provided for each of the key cards 22F and 22F'. In a case where the IC card is the IC card 21D, which is the modem card, the rear connector 56 is, as shown in FIG. 15, connected to a DAA 58 for establishing the connector with a public line. In a case where the IC card is the IC card 21E, the rear connector 56 is connected to a connector of a connection cable for a LAN, as shown in FIG. 16.

The operation will now be described. With respect to the IC card 21D serving as a modem card, the internal initialization (the configuration) of the IC card 21D is performed under the control of the host system 28 (see FIG. 9) to select, from the attribute memory 53, CIS information for realizing a modem function; and write the CIS information to a configuration register (not shown) provided for the signal control portion 52 or the like in the IC card 21D so that the IC card 21D is enabled to act as the modem card. Note that the foregoing initialization setting operation is prescribed in guidelines of JEIDA and PCMCIA, the teachings of which are hereby incorporated by reference. Similarly, with respect to the IC card 21E serving as the LAN card, the host system 28 performs control to cause CIS information for realizing a LAN function to be written on the configuration register so that the IC card 22F is able to act as a LAN card. In accordance with the logic of the interface IC of the signal control portion 52, the signal control portion 52 synthesizes, from a signal supplied from the host system 28, a signal to be transmitted to the modem controller 50A or the LAN controller 50B and transmits the signal. The modem controller 50A and the LAN controller 50B transmit/receive data to and from an external communication device through the rear connector 56 in response to the foregoing synthesized signal.

As described above, in this embodiment, the rear connector 56 for establishing the connection with an external communication device is provided for each of the key cards 22F and 22F'. Therefore, connection of the key cards 22F and 22F' each having the rear connector 56 adaptable to the connected communication device enables communication with any type of communication device, such as a device having a different pin configuration and a device having a locking mechanism. Thus, the convenience of the system can be improved.

Eighth Embodiment

Figure 17:
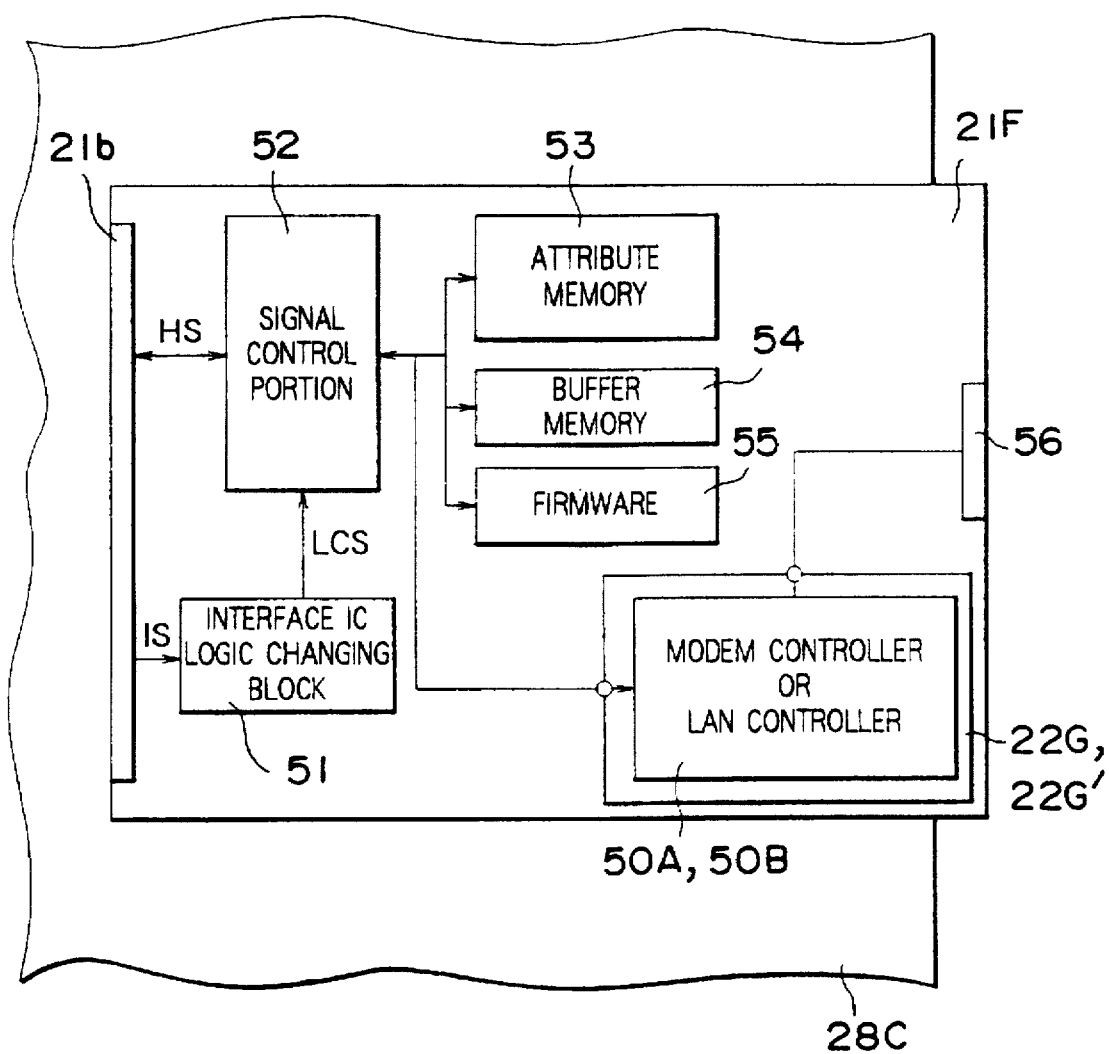
FIG. 17 is a block diagram showing the structure of an IC card and an individual key card according to an eighth embodiment of the present invention.
Figure 18:
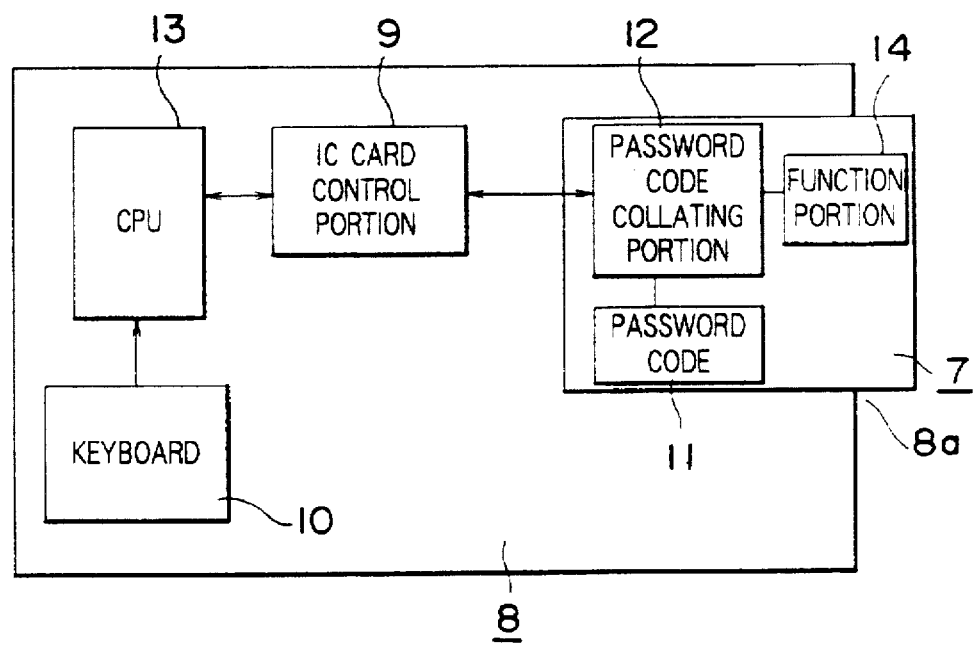
FIG. 18 is a block diagram showing the structure of a privately known IC card and host system.
Figure 19:
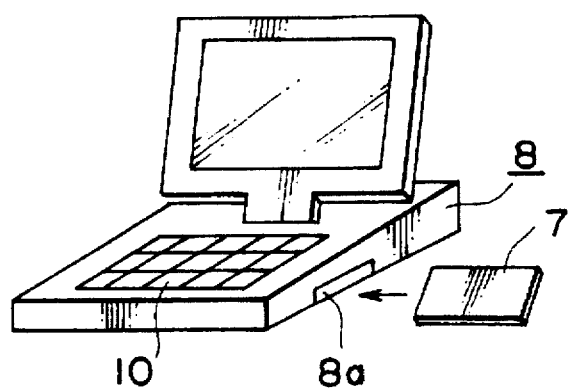
FIG. 19 is a perspective view showing the known IC card and host system.

In this embodiment, change of a key card 22G enables both a modem function and a LAN function to be realized with one IC card 21F. In this embodiment, as shown in FIG. 17, the IC card 21F includes a signal control portion 52, which is a second interface means comprising an interface IC for controlling communication with the host system; an attribute memory 53 storing CIS information (configuration index signal information) of the modem card and the LAN card; a buffer memory 54 required when the IC card 21F is used as a LAN card; and a firmware program memory 55 storing a firmware program required when the IC card 21F is used as a modem card. Furthermore, the IC card 21F is provided with a rear connector 56 for establishing a connection with an external communication device.

In this embodiment, the interface IC forming the signal control portion 52 comprises a programmable IC that is capable of changing the logic in the IC from the outside in accordance with control or the like performed by the host system 28C. The logic in the interface IC is changed between a case where the IC card 21F is used as the modem card and a case where the same is used as the LAN card. Therefore, in this embodiment, an interface IC logic changing block 51 is provided that transmits logic changing signal LCS for changing the logic in the interface IC of the signal control portion 52 in response to interface control signal IS from the host system 28C. In response to the logic changing signal LCS from the interface IC logic changing block 51, the internal logic of the signal control portion 52 is changed and set to cause the interface IC to act as the interface IC for the modem controller or the interface IC for the LAN controller. In accordance with the thus-set logic, the signal control portion 52, from signal HS supplied from the host system 28, synthesizes a signal to be supplied to the modem controller 50A or the LAN controller 50B, the synthesized signal being then transmitted. The interface IC logic changing block 51 is part of a logic changing means that changes the logic of the signal control portion 52, that is the interface means, to be adaptable to a first communication control means or a second communication control means.

In this embodiment, there are prepared the key card 22G mounted with the modem controller 50A having the modem function; and a key card 22G' mounted with the LAN controller 50B having the LAN function. Thus, when a user uses the IC card 21D as a modem card, the user inserts the key card 22G mounted with the modem controller 50A into the IC card 21F. When the user uses the IC card 21D as a LAN card, the user inserts the key card 22G' mounted with the LAN controller 50B. The modem controller 50A is part of the first communication control means that controls the communication by a first communication method, while the LAN controller 50B is part of the second communication control means that controls communication by a second communication method.

The operation will now be described. When the user uses the IC card 21F as a modem card, the user connects the key card 22G mounted with the modem controller 50A to the IC card 21F. When the interface control signal IS has been supplied from the host system 28C, the interface IC logic changing block 51 transmits the logic changing signal LCS to the signal control portion 52 to change the inside logic to cause the interface IC of the signal control portion 52 to act as the interface IC for the modem controller. Then, from the attribute memory 53, CIS information for realizing the modem function is selected to be written to the configuration register (not shown) so that the IC card 21F acts as the modem card.

Similarly, if the user uses the IC card 21F as a LAN card, the user connects the key card 22G' including a LAN controller to change the logic in the signal control portion 52 to serve as the interface IC for LAN and to write the CIS information for LAN to the configuration register so that the IC card 21F acts as the LAN card.

As described above, in this embodiment, the modem controller 50A and the LAN controller 50B are respectively mounted in the key cards 22G and 22G'; the key cards 22G and 22G' are enabled to be easily changed; and the logic of the interface IC of the signal control portion 52 can be changed easily under control from outside to be adaptable to the modem and the LAN. Thus, one IC card 21F is able to realize both the modem function and the LAN function.

Although the third to eighth embodiments have the structure that is provided with one key card, the present invention is not limited to this. A plurality of key cards may be provided as shown in FIG. 1, as the need arises. For example, the key card 22B, 22C or 22D for providing security according to the third to fifth embodiments may be provided for the IC card according to the sixth to eighth embodiments. The IC card 21F according to the eighth embodiment may be provided with the key cards 22F, and 22F' each having a rear connector 56 according to the seventh embodiment.

According to the first aspect of the present invention as described in the above summary of the invention, the IC card comprises: a main body; and a separative sub-card having a connector for being connected to the main body and an additional function disposed therein. Therefore, user is able to use sub-cards to meet the purposes so that a variety of additional functions are easily added and therefore the convenience of the IC card is improved.

According to the second aspect of the present invention, the IC card is an IC card that is connected to the host system at the time of use, the IC card comprising: a function portion disposed to the main body and having a function of the IC card; and switching control means provided over the connector from the main body to the sub-card for operating the function portion in response to a control signal from the host system only when the sub-card is connected to the main body through the connector; whereby insertion/removal of the sub-card causes whether or not the function portion is operated to be switched. Therefore, whether or not the function portion may be operated can be switched by inserting/removing the sub-card. Thus, the protective function or effect (the security function) against unlawful use of the IC card can be improved, and therefore unlawful use of the IC card can be prevented.

According to the third aspect of the present invention, the switching control means comprises: first insertion signal generating means for transmitting a signal indicating insertion of the sub-card when the sub-card has been inserted into the main body; signal control means electrically connected to the first insertion signal generating means for permitting supply of the control signal from the host system to the function portion only when the signal is supplied from the first insertion signal generating means and inhibitting the supply of the control signal to the function portion in other cases. Therefore, the function portion of the IC card can be operated only when the sub-card has been inserted. Thus, the protective function (the security function) against unlawful use of the IC card can be improved, and therefore unlawful use of the IC card can be prevented.

According to the fourth aspect of the present invention, the switching control means comprises: a first signal line provided to the main body and electrically connected to the function portion; a second signal line provided to the main body for receiving the control signal from the host system; and connection means provided to the sub-card for electrically connecting between the first signal line and the second signal line. Since the function portion of the IC card can be operated only when the sub-card has been inserted, the protective function (the security function) against unlawful use of the IC card can be improved, and therefore unlawful use of the IC card can be prevented. Since the structure is simplified, the cost can be reduced and manufacturing can be facilitated.

According to the fifth aspect of the present invention, the switching control means comprises: a password memory provided to the sub-card for storing a password code of the IC card; a password code collating portion provided to the main body for receiving a password signal from the outside through the host system and collating the password code of the password memory and the password signal supplied from the outside to each other so as to transmit a signal for operating the function portion only when the password code and the password signal coincide with each other. Therefore, only when the sub-card has been inserted and as well as the password signal supplied from the outside coincides with the password code of the password memory, the function portion of the IC card can be operated. Therefore, the protective function (the security function) against unlawful use of the IC card can be improved, and therefore unlawful use of the IC card can reliably be prevented.

According to the sixth aspect of the present invention, the IC card is an IC card that is connected to the host system at the time of use, the IC card comprising: a first memory provided in the main body; a second memory provided to the sub-card; and memory access means provided to the main body for accessing to the first and second memories under control of the host system. Therefore, insertion of the sub-card having the second memory enables the memory to easily expanded.

According to the seventh aspect of the present invention, the second memory comprises an erasable nonvolatile semiconductor memory. Even after the sub-card mounted with the second memory has been removed, the contents of the second memory are stored. Therefore, removal and safekeeping of the sub-card by a user result in prevention of unlawful access to the contents, and therefore the security can be improved.

According to the eighth aspect of the present invention, the memory access means comprises: second insertion signal generating means for generating a signal indicating insertion of the sub-card when the sub-card has been inserted into the main body; and insertion signal output means for transmitting the signal from the second insertion signal generating means to the host system. Therefore, the host system is able to detect insertion of the sub-card in response to the foregoing signals so that the host system is able to detect both of the first memory in the main body and the second memory of the sub-card being in an accessible state.

According to the ninth aspect of the present invention, the IC card is an IC card that is connected to the host system to permit communication between the host system and an external communication device, the IC card comprising: first interface means provided to the main body and connected to the connector so as to perform communication with the host system; a first rear connector provided to the sub-card for being connected to the communication device; and communication control means provided to the main body for being connected between the first interface means and the first rear connector so as to control the communication. Thus, a plurality of sub-cards having a variety of rear connectors are prepared to appropriately change the type of the rear connector to be adaptable to the type of the communication device. Therefore, connections with a variety of communication devices can be established and thus the convenience can be improved.

According to the tenth aspect of the present invention, the IC card is an IC card that is connected to the host system to permit communication between the host system and an external communication device, the IC card comprising: first and second of the sub-cards; second interface means provided to the main body and connected to the connector so as to perform communication with the host system; a second rear connector provided to the main body for being connected to the communication device; first communication control means so provided for the first sub-card for being connected between the second interface means and the second rear connector so as to control the communication by a first method; and second communication control means provided to the second sub-card for being connected between the second interface means and the second rear connector so as to control the communication by a second method; whereby exchanging between the first sub-card and the second sub-card enables the communication method to be changed between the first and second method. Thus, the communication method can be changed easily by exchanging the first and second sub-cards.

According to the eleventh aspect of the present invention, the first communication control means has a modem controller and the second communication control means has a LAN controller. Therefore, change of the subcards enables one IC card to perform both of a modem function and a LAN function.

According to the twelfth aspect of the present invention, the IC card further comprises logic changing means for changing logic of the interface means to be adaptable to any one of the first communication control means or the second communication control means under control of the host system. Thus, the logic of the second interface means can easily be changed from outside under control of the host system.

According to the thirteenth aspect of the present invention, the IC card further comprises falling-off preventing means provided to the sub-card and the main body for being mechanically engaged to each other so as to prevent fall-off of the sub-card from the main body. Thus, the sub-card can be secured into the main body by the falling-off preventing means so that fall-off of the sub-card is prevented and the electrical connection between the sub-card and the main body is stabilized.

According to the fourteenth aspect of the present invention, the IC card system comprises a host system and an IC card that is connected to the host system, wherein the IC card has a main body and a separative sub-card having a connector for being connected to the main body and an additional function disposed therein. Therefore, use of sub-cards that meet the purposes will enable a variety of functions to be easily and selectively added to the IC card. Thus, the convenience of the system can be improved.

What is claimed is:

1. An IC card and sub-card comprising:
   an IC card including:
   a main body including an IC providing various functions, a main connector, and a key card connector for connecting a sub-card; and
   a housing including an opening for receiving a sub-card inserted inside said housing for connection to said key card connector; and
   a sub-card having a connector for detachable connection to said key card connector when said sub-card is inserted inside said housing through the opening and including an IC providing a function in addition to the functions of said IC of said main body.

2. The IC card and sub-card as claimed in claim 1 wherein said IC card is connected to a host system via said main connector during use, said IC card comprising switching control means accessible via said key card connector from said main body to said sub-card for operating the functions of said IC card in response to a control signal from said host system only when said sub-card is connected to said main body through said key card connector.

3. The IC card and sub-card as claimed in claim 2 wherein said switching control means comprises:

first insertion signal generating means for transmitting a signal indicating presence of said sub-card when said sub-card has been connected to said main body; and signal control means electrically connected to said first insertion signal generating means for supplying the control signal from the host system to said main body only when the signal indicating presence is supplied from said first insertion signal generating means and inhibiting supply of the control signal otherwise.

4. The IC card and sub-card as claimed in claim 2 wherein said switching control means comprises:

a first signal line in said main body and electrically connected to said IC in said main body;

a second signal line in said main body for receiving the control signal from the host system; and connection means in said sub-card electrically connecting said first signal line and said second signal line.

5. The IC card and sub-card as claimed in claim 2 wherein said switching control means comprises:

a password memory in said sub-card for storing a password code of said IC card; and a password code collating portion in said main body for receiving a password signal through the host system and collating the password code of said password memory and the password signal received through the host system with each other to transmit a signal for operating said main body only when the password code and the password signal coincide with each other.

6. The IC card and sub-card as claimed in claim 1 wherein said IC card is connected to a host system during use, further comprising:

a first memory in said main body;

a second memory in said sub-card; and memory access means in said main body for accessing said first and second memories under control of the host system.

7. The IC card and sub-card as claimed in claim 6 wherein said second memory comprises an erasable nonvolatile semiconductor memory.

8. The IC card and sub-card as claimed in claim 6 wherein said memory access means comprises:

insertion signal generating means for generating a signal indicating presence insertion of said sub-card when said sub-card has been connected to said main body; and insertion signal output means for transmitting said signal from said second insertion signal generating means to the host system.

9. The IC card and sub-card as claimed in claim 1 wherein said IC card is connected to a host system for communication between the host system and an external communication device, further comprising:

interface means in said main body and connected to said main connector for communication with the host system;

a rear connector in said sub-card for connection to a communication device; and communication control means in said main body for connecting said interface means and said rear connector and for controlling communication.

10. The IC card and sub-card as claimed in claim 1 wherein said sub-card is a first sub-card and said IC card is connected to a host system for communication between the host system and an external communication device, further comprising:

a second sub-card, said first and second sub-cards being interchangeably connectable to said key card connector;

interface means in said main body and connected to said main connector for communication with a host system;

first and second rear connectors in said first and second sub-cards, respectively, for connection to communication devices;

first communication control means in said first sub-card for connecting said interface means to said second rear connector and for controlling communication in a first mode; and second communication control means in said second sub-card for connecting said interface means and said second rear connector and controlling communication in a second mode whereby interchanging connection of said first and second sub-cards to said key card connector enables the communication mode to be changed between the first and second modes.

11. The IC card and sub-cards as claimed in claim 10 wherein said first communication control means includes a modem controller and said second communication control means includes a LAN controller.

12. The IC card and sub-cards as claimed in claim 10 further comprising logic changing means for changing logic of said interface means to either of said first communication control means and said second communication control means under control of the host system.

13. The IC card and sub-card as claimed in claim 1 comprising falling-out preventing means in said sub-card and said main body for mechanically engaging each other to prevent said sub-card from falling out of said housing.

14. The IC card and sub-card according to claim 13 wherein said falling-out preventing means comprises:

first and second projections on opposing side surfaces of said sub-card; and first and second indentations in said main body for receiving said first and second projections, respectively.

* * * * *

UNITED STATES PATENT AND TRADEMARK OFFICE
CERTIFICATE OF CORRECTION

PATENT NO.   :   5,737,582
DATED        :   April 7, 1998
INVENTOR(S)  :   Fukuzumi It is certified that error appears in the above-identified patent and that said Letters Patent is hereby corrected as shown below:

Column 19, Line 53, delete --insertion--.

Signed and Sealed this

First Day of September, 1998

Attest:

BRUCE LEHMAN

*Attesting Officer*    *Commissioner of Patents and Trademarks*